United States Patent Office 2,940,903
Patented June 14, 1960

2,940,903
PROCESS FOR PRODUCING L-GLUTAMIC ACID

Tetsuo Ogawa, Tokyo, Toshinao Tsunoda, Zushi, Ryohei Aoki, Kazumoto Kinoshita, and Shinji Okumura, Tokyo, and Yasuhiro Kondo, Kawasaki, Japan, assignors to Ajinomoto Co., Inc., Tokyo, Japan, a corporation of Japan No Drawing. Filed Jan. 20, 1958, Ser. No. 709,757

Claims priority, application Japan Feb. 5, 1957

2 Claims. (Cl. 195—47)

The present invention relates to a process for producing L-glutamic acid. More particularly, this invention relates to a process for direct production of L-glutamic acid from γ-amino-butyric acid by fermentation.

In the heretofore known processes for producing L-glutamic acid by the utilization of microorganisms, there have been used, as principal raw materials, various sugars such as glucose, fructose, lactose, maltose, sucrose, pentose, molasses or the like, as well as certain kinds of organic acids such as α-keto-glutaric acid or citric acid. It is also known that aspartic acid or other amino acids are used as a subsidary material in the α-keto-glutaric acid transamination in order to increase the yield of L-glutamic acid.

Having observed the fact that γ-amino-butyric acid is an amino acid having no asymmetric carbon and which is obtainable at a comparatively low price by chemical synthesis, the inventors prosecuted exhaustive studies of the fermentation of γ-amino-butyric acid and succeeded in directly producing optically active glutamic acid viz. L-glutamic acid with extremely high yields.

Although Gale has found, according to his reports since 1940, that such bacteria as *Escherichia coli* acts upon L-glutamic acid to convert the latter into γ-amino-butyric acid by decarboxylation, and made a detailed study of it, extending to quantitative determination of L-glutamic acid, there has been neither information nor knowledge about the reverse reaction, that is to say, fermentation of γ-amino-butyric acid into L-glutamic acid.

It was found by the inventors that many kinds of microorganisms i.e. bacteria, fungi, yeast and the like grow well even in a media containing no other substance than γ-amino-butyric acid as a source of carbon and nitrogen. Thus the synthesis of L-glutamic acid from γ-amino-butyric acid by microorganisms was actually proved and the inventors were the first to find such a fact.

The inventors having observed the possibility of producing L-glutamic acid from γ-amino-butyric acid by fermentation and the usefulness of γ-amino-butyric acid as a principal raw material for industrial production of L-glutamic acid, have further determined the most suitable microorganisms from natural sources and the most desirable conditions for culturing the microorganisms, thereby providing new advantageous processes of converting γ-amino-butyric acid into L-glutamic acid by means of fermentation in accordance with the present invention.

The microorganisms newly isolated by the inventors which change γ-amino-butyric acid into L-glutamic acid, in other words, the microorganisms which accumulate L-glutamic acid in culture media containing γ-amino-butyric acid as the main raw material, were found to be of wide distribution in the natural world. They may be found almost everywhere so far as usual microorganisms can live at all, for examples, in soil, sewage and the like. They are mainly aerobic bacteria or facultative anaerobic bacteria. Such microorganisms belong to the genus Pseudomonas, the genus Xanthomonas, the genus Protaminobacter, the genus Micrococcus, the genus Corynebacterium, the genus Sarcina, the genus Alcaligenes, the genus Achromobacter, the genus Flavobacterium, the genus Escherichia, the genus Aerobacter, the genus Serratia, the genus Proteus, the genus Bacillus or the genus Bacterium.

It is a principal object of this invention to produce L-glutamic acid directly from a compound without passing through intermediate stages as is usual in chemical synthesis.

It is a further object of the present invention to produce L-glutamic acid with ease and with a high yield.

It is a further object of the instant invention to produce L-glutamic acid from γ-amino-butyric acid which is an amino acid having no asymmetric carbon and obtainable at a comparatively low price by a chemical process.

Further objects of this invention will become more apparent from the following detailed description of illustrative examples.

Processes for producing L-glutamic acid in accordance with this invention may be carried out in the manner indicated below.

Either a synthetic medium, which contains γ-amino-butyric acid, as the main sources of carbon and nitrogen, and some mineral salts essential to support living microorganisms, such as, potassium phosphate, magnesium sulfate, ferrous sulfate, and the like and which has been neutralized, or a complex medium which contains for the most part γ-amino-butyric acid and to which has been added a small quantity of sugar (such as glucose, fructose, lactose, maltose, sucrose, pentose or molasses), organic acid, organic or inorganic nitrogenous nutrient (such as soybean cake, fish meal, casein, peptone, bouillon, yeast extract, mould extract or amino acid), inorganic salts and vitamines, is inoculated with strongly L-glutamic acid-producing bacteria selected from among the above listed microorganisms and subjected to aerobic submerged culture or static culture at its growth temperature. The inoculated microorganisms grow in the medium, γ-amino-butyric acid is metabolized and L-glutamic acid is gradually accumulated in the medium, its amount being increased by degrees as the fermentation period proceeds. Contrary to expectations, the formation of amino acids other than L-glutamic acid is rather slight and only a small quantity of L-alanine may be produced in cases where certain kinds of the microorganisms are used. Separation of L-glutamic acid from the fermentation broth and purification thereof may be easily performed in usual ways well known in the art. For example, fermentation broth, from which bacterial cells have been separated, is concentrated to cause L-glutamic acid to crystallize out at its isoelectric point. Ion-exchange resins may also be utilized for the separation of L-glutamic acid.

The following examples are given to afford a clearer understanding of the invention but are not to be construed as limiting the same:

Example 1

A culture medium, 100 cc. in volume, containing 1.0 g. of γ-amino-butyric acid, 0.1 g. of $KH_2PO_4$ and 0.04 g. of $MgSO_4 7H_2O$ and neutralized by sodium hydroxide to pH 6.8–7.0, was inoculated with *Corynebacterium helvolum* and subjected to shaking culture at 30° C.

After 48 hours, 0.25 g. of L-glutamic acid was produced in the fermentation broth. The yield of L-glutamic acid from consumed γ-amino-butyric acid was 71% by weight.

Example 2

A culture medium, 100 cc. in volume, containing 2.0 g. of γ-amino-butyric acid, 0.1 g. of $KH_2PO_4$, 0.04 g. of $MgSO_4 7H_2O$ and 0.1 g. of glucose and neutralized to pH 7.2, was inoculated with *Bacillus pumilus* and subjected to shaking culture at 30° C. After 54 hours, 0.6 g. of produced L-glutamic acid and 1.2 g. of unchanged γ- amino-butyric acid were found in the fermentation broth. The yield of L-glutamic acid from consumed γ-amino-butyric acid was 75% by weight.

*Example 3*

19 culture media, each 100 cc. in volume, and each containing 1.0 g. of γ-amino-butyric acid, 0.1 g. of $KH_2PO_4$ and 0.04 g. of $MgSO_4 7H_2O$ as in Example 1 and neutralized by sodium hydroxide to pH 7.0, were inoculated with each bacterium listed in the following table and subjected to shaking culture at 30° C.

The amounts of L-glutamic acid produced in said culture media after 43 hours were as follows:

| Bacteria: | L-glutamic acid (g./dl) |
|---|---|
| Pseudomonas fluorescens | 0.08 |
| Pseudomonas aeruginosa | 0.05 |
| Pseudomonas cruciviae | 0.04 |
| Pseudomonas ovails | 0.03 |
| Pseudomonas gelidicola | 0.05 |
| Xanthomonas pruni | 0.10 |
| Sarcina lutea | 0.12 |
| Escherichia coli–7 | 0.10 |
| Escherichia coli–8 | 0.09 |
| Aerobacter aerogenes | 0.08 |
| Serratia marcescens | 0.07 |
| Serratia plymuthicum | 0.05 |
| Proteus vulgaris | 0.06 |
| Bacillus subtilis–1 | 0.10 |
| Bacillus subtilis–2 | 0.08 |
| Bacillus cereus | 0.08 |
| Bacillus megatherium | 0.09 |
| Bacillus natto–1 | 0.20 |
| Bacillus natto–2 | 0.10 |

Although the above listed bacteria produced smaller quantities of L-glutamic acid than those cases where *Corynebacterium helvolum* and *Bacillus pumilus* respectively, were used to produce extremely high yields of L-glutamic acid, the bacteria listed under Example 3 may be individually or jointly utilized in processes in accordance with this invention.

What is claimed is:

1. A process for producing L-glutamic acid which comprises adding γ-amino-butyric acid, as the main raw material, to a culture medium containing such mineral salts as are essential to support living microorganisms, adjusting the pH of said culture medium to 7.0 approximately, inoculating said medium with at least one member selected from among the group consisting of *Bacillus pumilus, Corynebacterium helvolum, Bacillus natto, Sarcina lutea, Xanthomonas pruni, Escherichia coli, Bacillus subtilis, Aerobacter aerogenes, Bacillus cereus, Bacillus megatherium, Pseudomonas fluorescens, Pseudomonas aeruginosa, Pseudomonas cruciviae, Pseudomonas ovalis, Pseudomonas gelidicola, Serratia marcescens, Serratia plymuthicum* and *Proteus vulgaris*, maintaining said medium at a temperature from about 27° C. to about 37° C., so that γ-amino-butyric acid is metabolized and L-glutamic acid is gradually accumulated in said medium, and separating the L-glutamic acid thus formed from the fermentation broth.

2. A process for producing L-glutamic acid as in claim 1, wherein said mineral salts are selected from the group consisting of potassium phosphate, magnesium sulfate and ferrous sulfate.

References Cited in the file of this patent

UNITED STATES PATENTS

| 2,749,279 | Smythe et al. | June 5, 1956 |
| 2,789,939 | Kita | Apr. 23, 1957 |

OTHER REFERENCES

Meister: "Biochemistry of Amino Acids," Academic Press Inc., New York (1957), pp. 167 and 174.